(12) United States Patent
Jenkins et al.

(10) Patent No.: US 11,641,511 B2
(45) Date of Patent: May 2, 2023

(54) SELECTIVE CONTENT TRANSFER FOR STREAMING CONTENT

(71) Applicant: INTERNATIONAL BUSINESS MACHINES CORPORATION, Armonk, NY (US)

(72) Inventors: Jana H. Jenkins, Raleigh, NC (US); Vidya Nambiar, Durham, NC (US); Pratyusha Mandapati, Morrisville, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/448,223

(22) Filed: Sep. 21, 2021

(65) Prior Publication Data

US 2023/0088712 A1 Mar. 23, 2023

(51) Int. Cl.
*H04N 21/6587* (2011.01)
*H04N 21/24* (2011.01)
*G06F 3/01* (2006.01)

(52) U.S. Cl.
CPC ......... *H04N 21/6587* (2013.01); *G06F 3/013* (2013.01); *H04N 21/24* (2013.01)

(58) Field of Classification Search
CPC ..... H04N 21/6587; H04N 21/24; G06F 3/013
See application file for complete search history.

(56) References Cited

U.S. PATENT DOCUMENTS

| 7,767,896 | B2 | 8/2010 | Kameyama |
| 10,051,327 | B1 | 8/2018 | Nieuwenhuys |
| 10,149,008 | B1 | 12/2018 | Logan |
| 10,341,742 | B1 | 7/2019 | Kim |
| 2017/0223413 | A1 | 8/2017 | Kozloski |
| 2017/0257669 | A1 | 9/2017 | Liu |

(Continued)

FOREIGN PATENT DOCUMENTS

| CN | 113709566 A | 11/2021 |
| EP | 1843591 A1 | 10/2007 |

OTHER PUBLICATIONS

Disclosed Anonymously, "Television Monitors the Viewer's Eye Contact with the Screen and then Alerts Them If They Miss a Key Point; For Example, If the Viewer Misses On-Screen Text That Says '3 Weeks Earlier,'" IP.com Prior Art Database Technical Disclosure, IP.Com No. IPCOM000262394D, May 27, 2020, pp. 1-3.

(Continued)

*Primary Examiner* — Oschta I Montoya
(74) *Attorney, Agent, or Firm* — L. Jeffrey Kelly (57) ABSTRACT

A method, computer system, and computer program product for selectively delivering missed content to a user are provided. The embodiment may include identifying a user's eye direction, awareness, and attentiveness using a wearable device. The embodiment may also include determining whether the user is in a physical place where the user is viewing a live event. The embodiment may further include determining a minimum level of an attentiveness score for the user. The embodiment may also include identifying the attentiveness score of the user while watching any content when the user's attentive score is below a preconfigured threshold value. The embodiment may further include delivering content that the user missed based on the attentive score.

17 Claims, 6 Drawing Sheets

(56) References Cited

U.S. PATENT DOCUMENTS

| | | | |
|---|---|---|---|
| 2018/0184974 A1 | 7/2018 | Cimenser | |
| 2018/0204380 A1* | 7/2018 | Kumar | |
| 2019/0205839 A1* | 7/2019 | Dotan-Cohen | H04L 67/535 |
| 2020/0409519 A1* | 12/2020 | Faulkner | H04N 21/44008 |
| 2022/0312071 A1* | 9/2022 | Devaraj | H04N 21/42201 |

OTHER PUBLICATIONS

Mell et al., "The NIST Definition of Cloud Computing," National Institute of Standards and Technology, Special Publication 800-145, Sep. 2011, pp. 1-7.

Patent Yogi, "IBM Will Now Let You Transfer Data With Just a Look," patentyogi.com, accessed Apr. 13, 2021, pp. 1-4, Retrieved from the Internet <https://patentyogi.com/latest-patents/IBM/IBM-will-now-let-you-transfer-data-with-just-a-look/>.

Notification of Transmittal of the International Search Report and the Written Opinion of the International Searching Authority, or the Declaration, dated Nov. 28, 2022, Applicant's or agent's file reference PF220621PCT, International application No. PCT/CN2022/119862, 12 pages.

* cited by examiner

SELECTIVE CONTENT TRANSFER FOR STREAMING CONTENT

BACKGROUND

The present invention relates, generally, to the field of computing, and more particularly to streaming media systems.

Streaming media is multimedia that is delivered in a continuous manner from a source. Livestream is the real-time delivery of content during production. Music, video, and other types of media files are prearranged and transmitted in sequential packets of data so they can be streamed instantaneously. There are several advantages of streaming media versus traditional store-and-display systems. There is not much waiting for downloads, and no physical copies of the content are stored locally. This means no storage is required on the client-side. However, lost or damaged packets or missed deadlines may cause a delay in the display of the streaming content. Streaming media is usually streamed from prerecorded files but can also be distributed as part of a live broadcast feed. In a live broadcast, the video signal is converted into a compressed digital signal and transmitted from a Web server as multicast.

SUMMARY

According to one embodiment, a method, computer system, and computer program product for selectively delivering missed content to a user are provided. The embodiment may include identifying a user's eye direction, awareness, and attentiveness using a wearable device. The embodiment may also include determining whether the user is in a physical place where the user is viewing a live event. The embodiment may further include determining a minimum level of an attentiveness score for the user. The embodiment may also include identifying the attentiveness score of the user while watching any content when the user's attentive score is below a preconfigured threshold value. The embodiment may further include delivering content that the user missed based on the attentive score.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to selective content transfer with respect to streaming content. The following described exemplary embodiments provide a system, method, and program product to track a user's eye contact, level of attention, and cognitive state while watching any streaming media content or live content from the physical location, and if the system identifies the user might have missed the content for any reason of distraction, the system may automatically deliver the predicted content section which was missed by the user. Therefore, the present embodiment has the capacity to improve the technical field of streaming media systems by determining the content or part of the content that a user may miss while watching the media content and automatically delivering the missed content to the user to help the user understand the media content entirely.

As previously described, streaming media is multimedia that is delivered in a continuous manner from a source. Livestream is the real-time delivery of content during production. Music, video, and other types of media files are prearranged and transmitted in sequential packets of data so they can be streamed instantaneously. There are several advantages of streaming media versus traditional store-and-display systems. There is not much waiting for downloads, and no physical copies of the content are stored locally. This means no storage is required on the client-side. However, lost or damaged packets or missed deadlines may cause a delay in the display of the streaming content. Streaming media is usually streamed from prerecorded files but can also be distributed as part of a live broadcast feed. In a live broadcast, the video signal is converted into a compressed digital signal and transmitted from a Web server as multicast.

While watching any streaming or live content, a user needs a minimum level of attention and cognitive state to understand the streaming content. While watching the content, the user may become distracted and lose eye contact with the content due to the user's attention being drawn elsewhere, feeling sleepy, moving away from the user seat, or feeling upset or sad. If a user becomes distracted for any reason, the user will miss part of the content or become unable to understand the content as a whole. As such, it may be advantageous to, among other things, implement a system capable of tracking a user's eye contact, level of attention, and cognitive state while watching any streaming media content or live content, and accordingly if the method identifies the user might have missed the content for any reason of distraction, then the system will automatically deliver the predicted content section which was missed. It may also be advantageous to implement such a system to utilize a camera and IoT-enabled wearable devices to track a user's eye contact, level of attention, cognitive state, etc.

According to one embodiment, the present invention may identify if a user is distracted while watching any streaming or live content based on the level of distraction that is more than the threshold limit of one or more portions of the content. In at least one other embodiment, the present invention may selectively deliver the content that a user may have missed due to distraction, poor cognitive state, etc. In yet another embodiment, the present invention may analyze historical data to learn about selective content to be delivered based on the user's distraction timing.

The present invention may be a system, a method, and/or a computer program product at any possible technical detail level of integration. The computer program product may include the computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for tracking a user's eye contact, level of attention and cognitive state, etc while watching any streaming media content or live content from the physical location, and automatically delivering predicted content section which was missed by the user.

Figure 1:
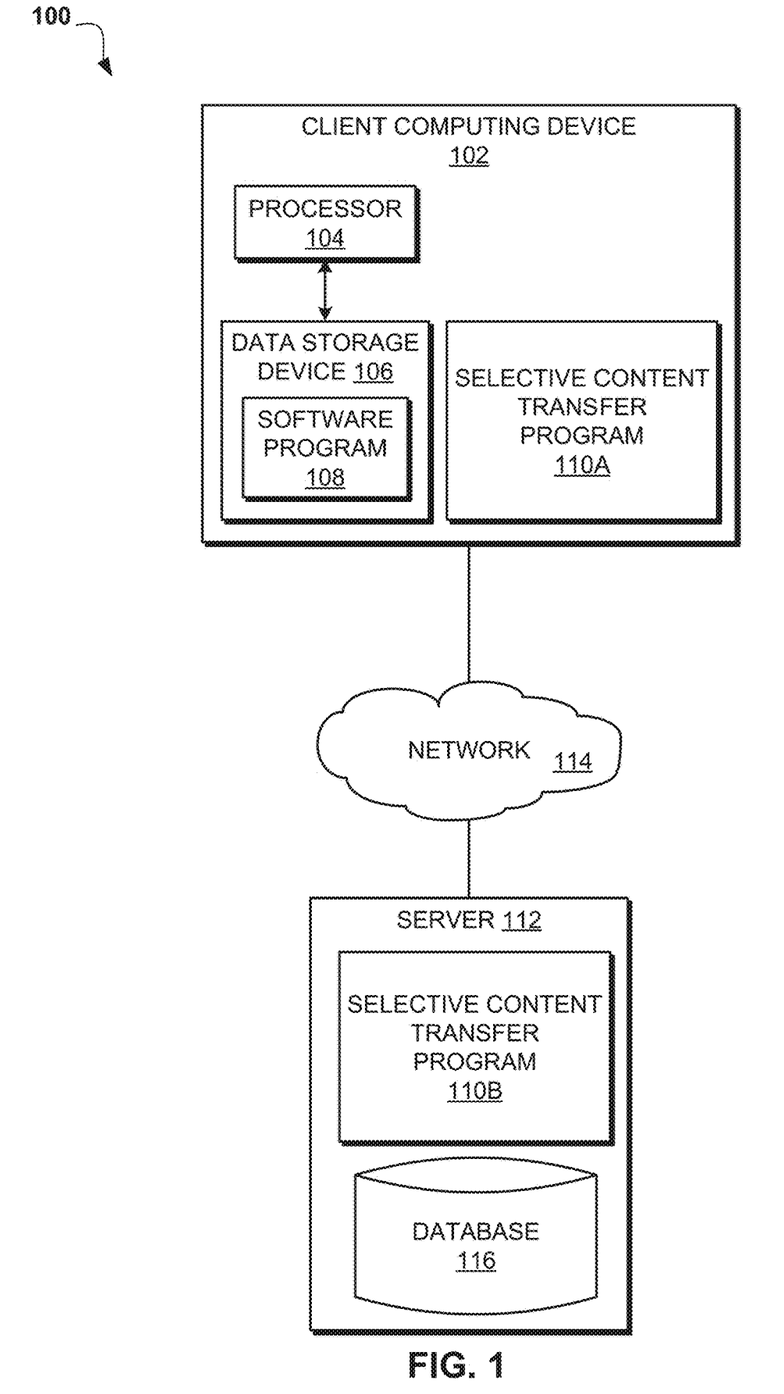
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a selective content transfer program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a selective content transfer program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the selective content transfer program 110A, 110B may be a program capable of identifying a user focus direction using a head-mounted display device, external cameras, or a smartwatch. The selective content transfer program 110A, 110B may also determine a user attention level score with respect to a user's interest in particular content. The selective content transfer process is explained in further detail below with respect to FIG. 2.

Figure 2:
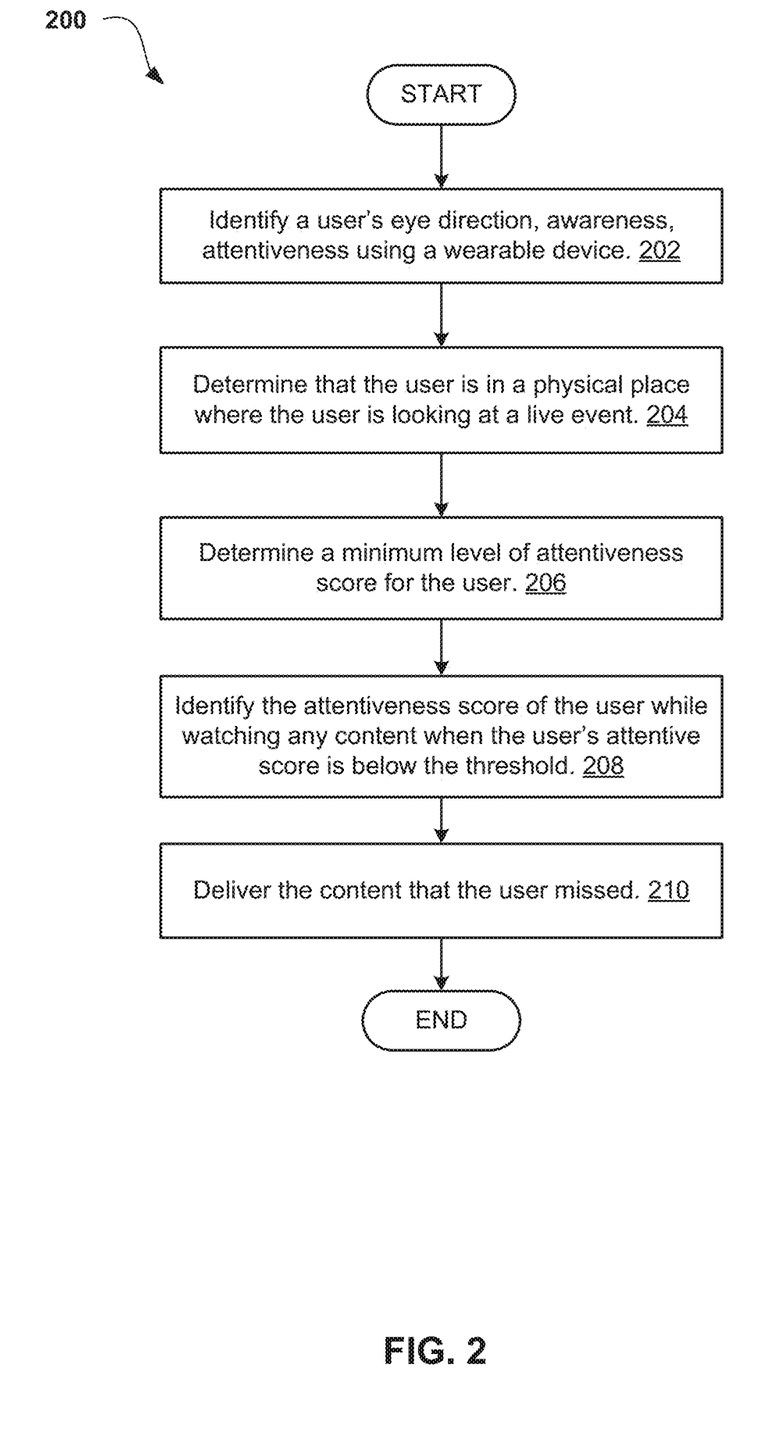
FIG. 2 is an operational flowchart illustrating a selective content transfer process according to at least one embodiment.

FIG. 2 is an operational flowchart illustrating a selective content transfer process 200 according to at least one embodiment. At 202, the selective content transfer program 110A, 110B identifies a user's eye direction, awareness, attentiveness using a wearable device. According to one embodiment, the selective content transfer program 110A, 110B may use a wearable device such as a smartwatch, head-mounted display device, external cameras, or cameras with a head-mounted display device to identify the user's focus direction, cognitive state, sleep or drowsiness status. In one embodiment, the selective content transfer program 110A, 110B may determine a user's attention level based on the determination of whether the user is looking at the content.

At 204, the selective content transfer program 110A, 110B determines that the user is in a physical place where the user is looking at a live event. According to one embodiment, the selective content transfer program 110A, 110B may pair the user's device with the display device where the user is currently looking or watching. For example, a TV or the user's device may identify that the user is in a physical place if the selective content transfer program 110A, 110B determines that the user is looking at the TV.

At 206, the selective content transfer program 110A, 110B determines a minimum level of attentiveness score for the user. According to one embodiment, the selective content transfer program 110A, 110B may gather historical data and crowdsource feedback via emails or SMS to compute a minimum attention level score for a user when the user is watching or viewing any streaming content. In one embodiment, the selective content transfer program 110A, 110B may use an IoT and camera-enabled system to analyze a user's relative position along with other users. For example, the user's device may gather data from various other IoT sensors or cameras to identify a user's attentive score when the user is viewing a display device while media is being played. In one embodiment, the selective content transfer program 110A, 110B may use mobile devices to gather the attentiveness score on a real-time basis. In at least one other embodiment, the selective content transfer program 110A, 110B may align the real-time attentiveness score with the media content that the user is currently viewing such that the recorded attentiveness score may be used in the future to calculate a minimum level of attentiveness score for a particular user when the user watches similar content or is in a similar physical location to view a similar live event. Various IoT sensor feed, such as compass-based direction identification techniques may be used to analyze and log the attentiveness score.

In at least one other embodiment, the selective content transfer program 110A, 110B may derive an attentiveness score from a number of biometric, voice sensors, etc. The selective content transfer program 110A, 110B may utilize a computing system connected to a head mounted device to process a set of electroencephalograms (EEG) signals to detect a user's response to visual or auditory stimuli. For example, the selective content transfer program 110A, 110B may analyze output level of attentiveness for the user based on the measurements of the peak-amplitude and the peak-time value of a particular event-related potential (ERP) waveform. The selective content transfer program 110A, 110B may further analyze time-based imagery of an eye of the user using an ocular camera of a head mounted device. Head mounted devices may include electronic devices that feature one or more graphical display(s) and are may be wearable upon the head of a user.

At 208, the selective content transfer program 110A, 110B identifies the attentiveness score of the user while watching any content when the user's attentive score is below the threshold. According to one embodiment, the selective content transfer program 110A, 110B may use mobile devices to identify the attentiveness scores of the user while the user is watching TV or live sports in a stadium and identify the specific time range when the user's attentiveness score is below the threshold limit. In one embodiment, the selective content transfer program 110A, 110B uses mobile devices to highlight the areas or the types of content where the attentiveness score is below the threshold limit. In yet another embodiment, the selective content transfer program 110A, 110B may determine the specific content ranges where the user's attentiveness score is below the threshold limit.

At 210, the selective content transfer program 110A, 110B delivers the content that the user missed. According to one embodiment, the selective content transfer program 110A, 110B may deliver part of the content where the user's attentiveness score was below the threshold limit. the selective content transfer program 110A, 110B may consider the time range and or the content range together when selecting the part of the content to be delivered to the user. In one embodiment, the selective content transfer program 110A, 110B may enable a user to select one or more portions of the content where the user's attentiveness score was low such that the user may replay the one or more portions only. The user may also view the replay of the content where the attentiveness score was low while the user is still viewing the live event. In yet another embodiment, the selective content transfer program 110A, 110B may capture photographs or video clips of the relevant content of any live event such as a sports event when a user's attentiveness score fell below the preconfigured threshold. The selective content transfer program 110A, 110B may deliver the captured photographs or video clips to the user such that the user may view what was taking place in the surrounding when the user's attentiveness score was below the threshold. In yet another embodiment, the selective content transfer program 110A, 110B may consider the user's viewing direction and the physical location when the user is viewing a live event and search media content on a social network site for the photographs or the video clips that were captured in the similar direction or from the similar angle or position.

Figure 3:
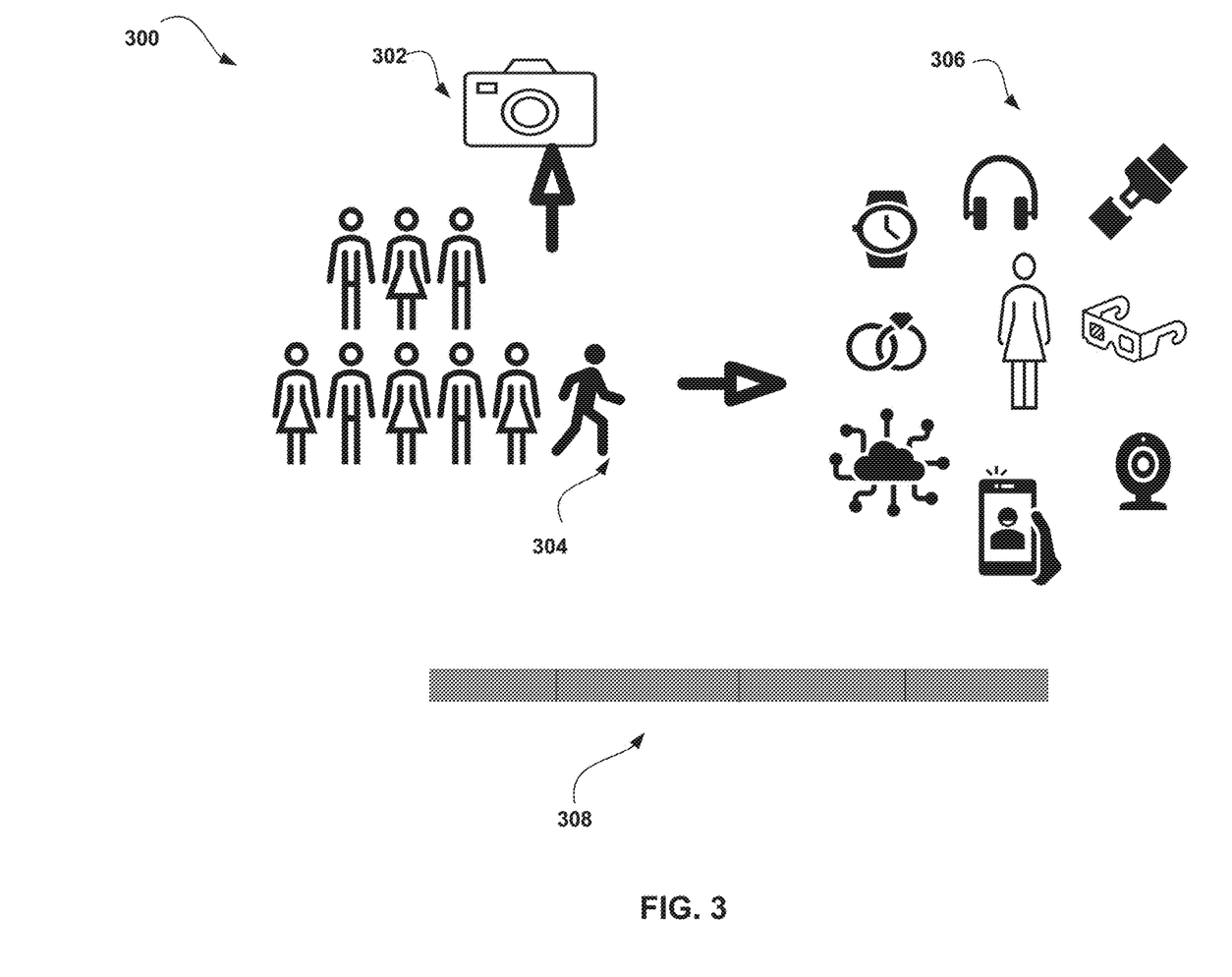
FIG. 3 is a functional block diagram of an exemplary selective content transfer process according to at least one embodiment.

Referring now to FIG. 3, an exemplary diagram of a selective content transfer process 300 is depicted according to at least one embodiment. According to one embodiment, the selective content transfer program 110A, 110B may receive and analyze a photograph 302 that other individuals have captured when a user 304 was not attentive. the selective content transfer program 110A, 110B may determine the user 304 was located in a physical location where a live event was taking place and search for the live event content 308 that the user 304 was missing based on the timing of when the photograph 302 was taken and the location information extracted from the background of the photograph 302. In at least one other embodiment, the selective content transfer program 110A, 110B may use a wearable device 306 such as a smartwatch, a head-mounted display, or other IoT wearables to identify that the user 304 was not attentive at a certain time during the duration of the live event. the selective content transfer program 110A, 110B may also analyze the data collected by the wearable device 306 to determine the time range and the location to identify the content 308 that the user was not attentive.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the selective content transfer program 110A, 110B may identify a user's current mental and physical condition to calculate an attentiveness score. In at least one embodiment, the selective content transfer program 110A, 110B may utilize a face camera to track the time change of the eye gaze or other expressions and output the data in discrete waveforms. The face camera may also be used to magnify and detect a direction of an iris of a user's eye to detect or identify a direction of the face or the iris of the users. In yet another embodiment, the selective content transfer program 110A, 110B may utilize other sensors, such as microphones, blood pressure sensors, skin sensors or iris cameras to detect and analyze the user's mental state. For example, a microphone may be used to detect a user voice and determine the mental state of the user and an iris camera may be used to analyze a size of a pupil of a user to estimate the biological condition of the user.

Figure 4:
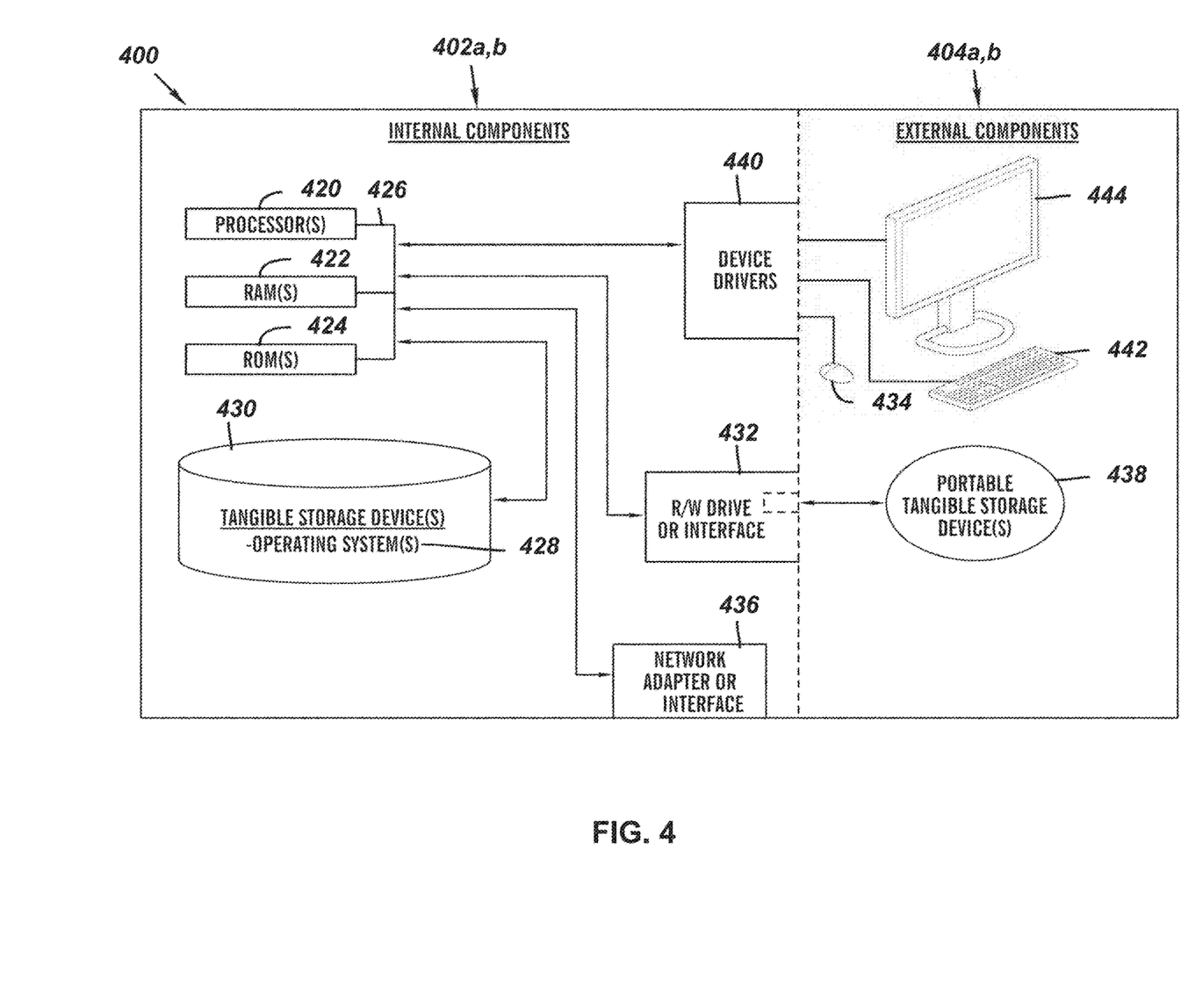
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the selective content transfer program 110A in the client computing device 102 and the selective content transfer program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the selective content transfer program 110A, 110B can be stored on one or more of the respective portable computer-readable tangible storage devices 438, read via the respective R/W drive or interface 432 and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The software program 108 and the selective content transfer program 110A in the client computing device 102 and the selective content transfer program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the selective content transfer program 110A in the client computing device 102 and the selective content transfer program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
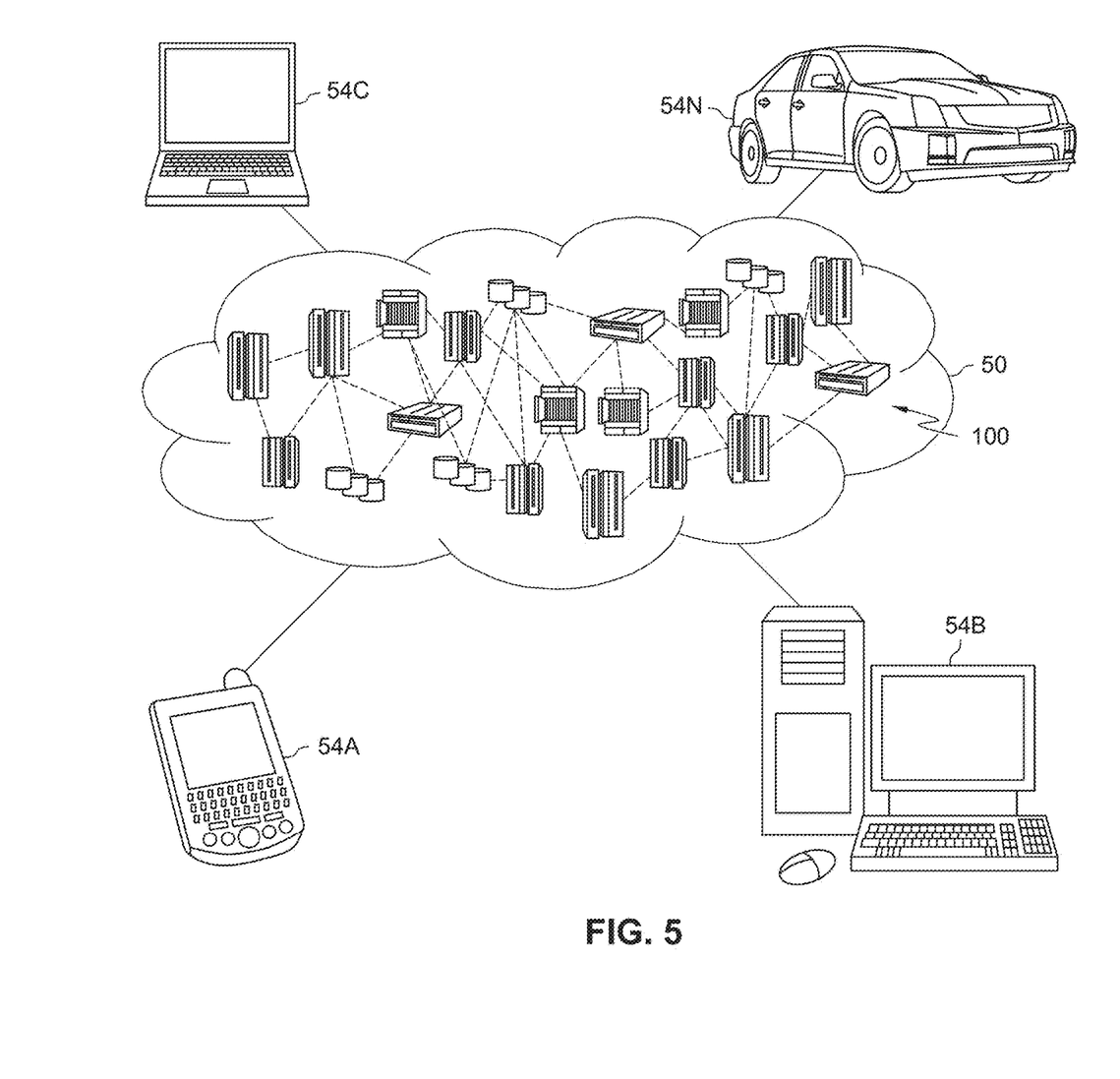
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
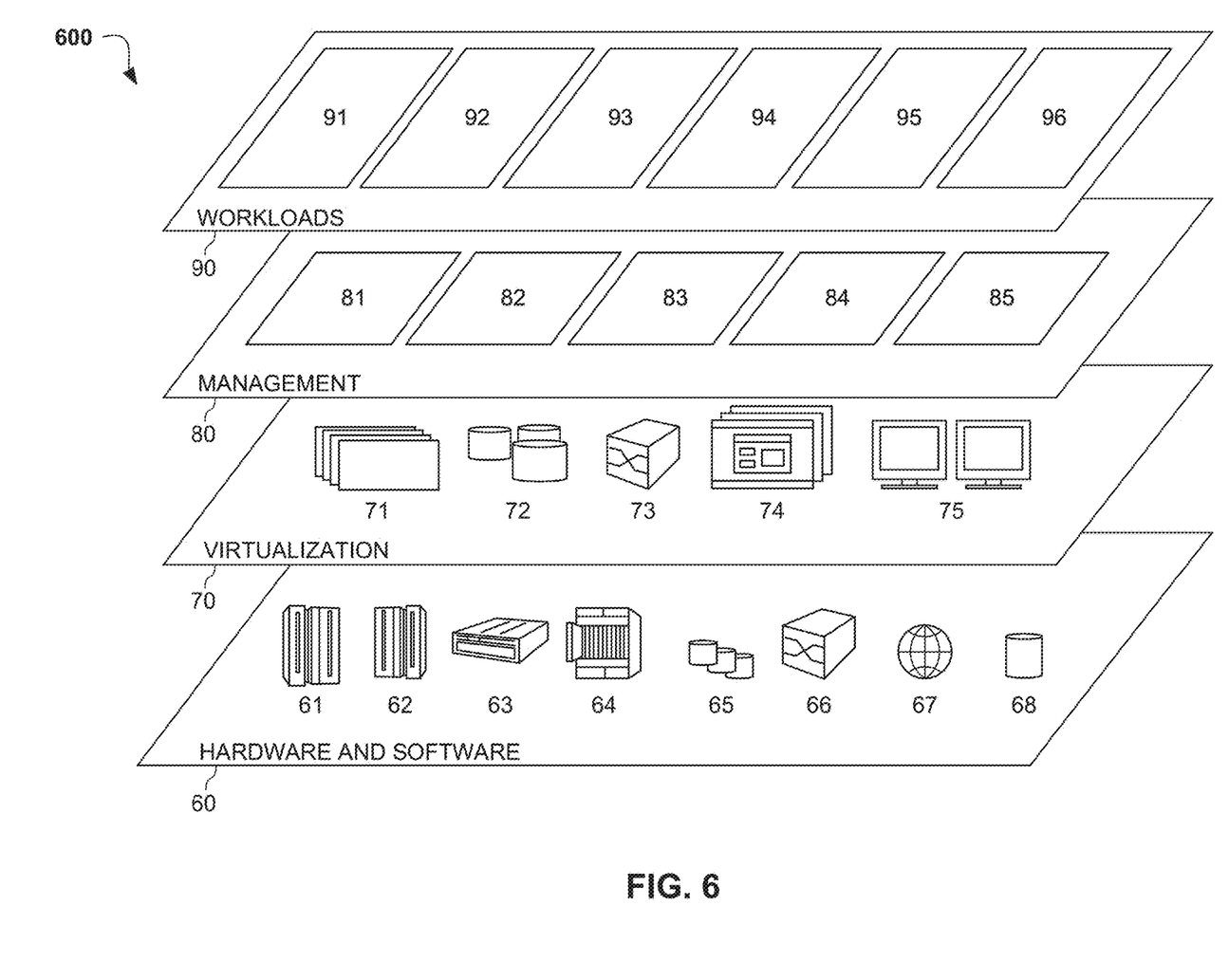
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective content transfer 96. Selective content transfer 96 may relate to selectively delivering missed content to a user based on the user's attentiveness score calculated using various wearable devices.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for selectively delivering missed content to a user, the method comprising:
   identifying, by a processor, a user's eye direction, awareness, and attentiveness using a wearable device;
   determining, by the processor, whether the user is in a physical place where the user is viewing a live event;
   determining, by the processor, a minimum level of an attentiveness score for the user;
   identifying, by the processor, the attentiveness score of the user while watching any content when the user's attentive score is below a preconfigured threshold value;
   searching a social network site for content shared by others for a time duration when the user's attentiveness score is below the threshold value, the user's location, and viewing direction of the user; and
   delivering, by the processor, content that the user missed based on the attentive score.

2. The method of claim 1, further comprising:
   determining the minimum level of the attentiveness score using a head-mounted display device, external cameras, or a smartwatch.

3. The method of claim 1, wherein the preconfigured threshold value is determined using historical learning or crowdsourced feedback.

4. The method of claim 1, further comprising:
   determining a time range when the user attentiveness score is below the threshold value.

5. The method of claim 1, wherein the delivered content corresponds with time points when the user attentiveness score is below the threshold value.

6. The method of claim 1, wherein the content includes streaming media.

7. A computer system for selectively delivering missed content to a user, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

identifying a user's eye direction, awareness, and attentiveness using a wearable device;

determining whether the user is in a physical place where the user is viewing a live event;

determining a minimum level of an attentiveness score for the user;

identifying the attentiveness score of the user while watching any content when the user's attentive score is below a preconfigured threshold value; and searching a social network site for content shared by others for a time duration when the user's attentiveness score is below the threshold value, the user's location, and viewing direction of the user; and delivering content that the user missed based on the attentive score.

8. The computer system of claim 7, further comprising:
determining the minimum level of the attentiveness score using a head-mounted display device, external cameras, or a smartwatch.

9. The computer system of claim 7, wherein the preconfigured threshold value is determined using historical learning or crowdsourced feedback.

10. The computer system of claim 7, further comprising:
determining a time range when the user attentiveness score is below the threshold value.

11. The computer system of claim 7, wherein the delivered content corresponds with time points when the user attentiveness score is below the threshold value.

12. The computer system of claim 7, wherein the content includes streaming media.

13. A computer program product for selectively delivering missed content to a user, the computer program product comprising:
one or more computer-readable tangible storage media and program instructions stored on at least one of the one or more tangible storage media, the program instructions executable by a processor of a computer to perform a method, the method comprising:

identifying a user's eye direction, awareness, and attentiveness using a wearable device;

determining whether the user is in a physical place where the user is viewing a live event;

determining a minimum level of an attentiveness score for the user;

identifying the attentiveness score of the user while watching any content when the user's attentive score is below a preconfigured threshold value;

searching a social network site for content shared by others for a time duration when the user's attentiveness score is below the threshold value, the user's location, and viewing direction of the user; and delivering content that the user missed based on the attentive score.

14. The computer program product of claim 13, further comprising:
determining the minimum level of the attentiveness score using a head-mounted display device, external cameras, or a smartwatch.

15. The computer program product of claim 13, wherein the preconfigured threshold value is determined using historical learning or crowdsourced feedback.

16. The computer program product of claim 13, further comprising:
determining a time range when the user attentiveness score is below the threshold value.

17. The computer program product of claim 13, wherein the delivered content corresponds with time points when the user attentiveness score is below the threshold value.

* * * * *